Sept. 8, 1925.
T. C. SPELLING
WATER HOIST
1,552,514
Filed Oct. 15, 1923 3 Sheets-Sheet 2
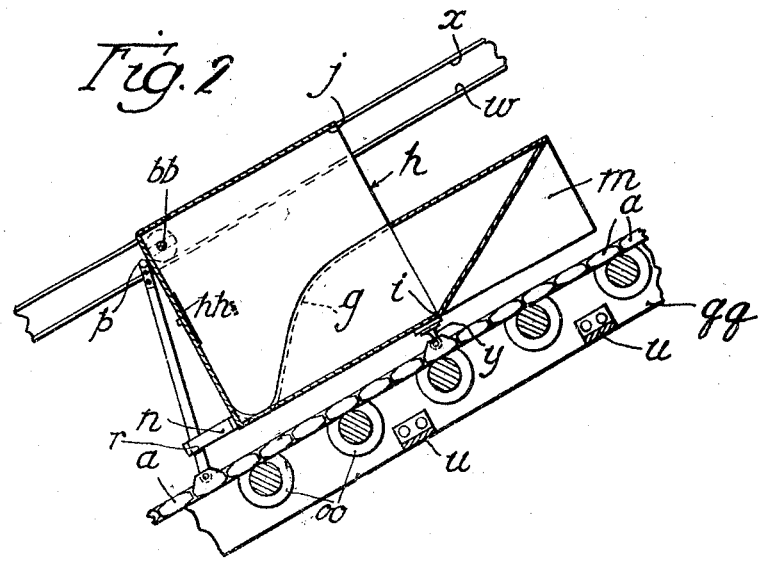
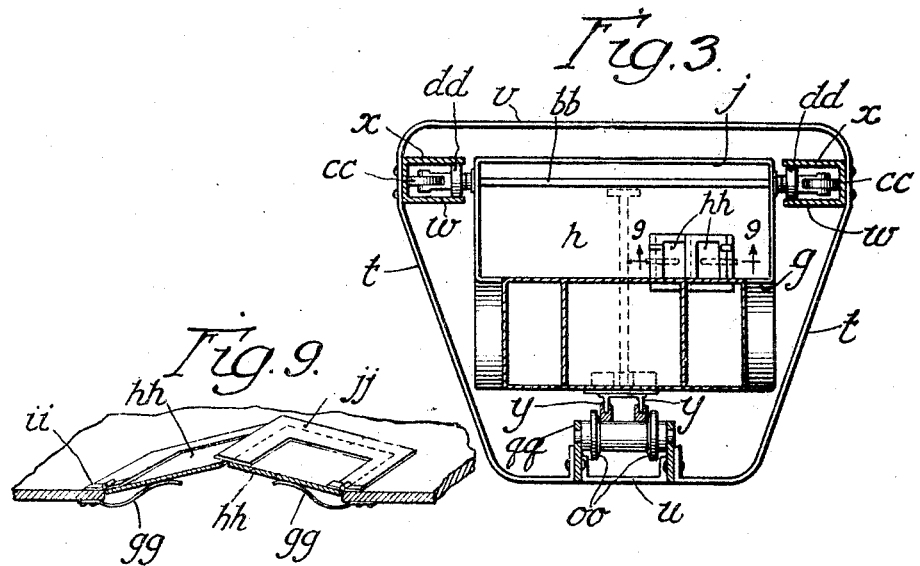
Thomas C. Spelling
Inventor Sept. 8, 1925.
T. C. SPELLING
WATER HOIST
Filed Oct. 15, 1923
1,552,514
3 Sheets-Sheet 3
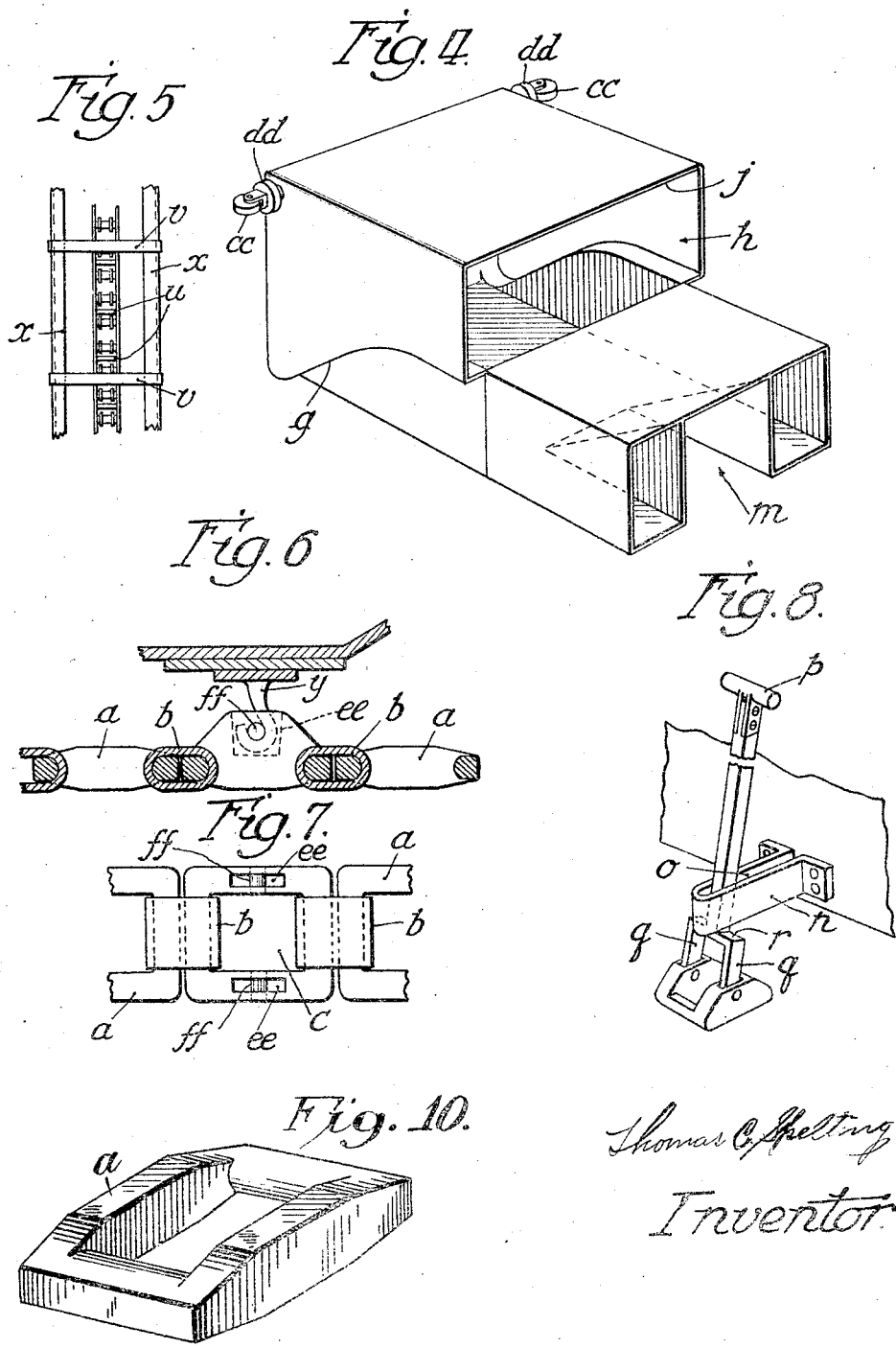

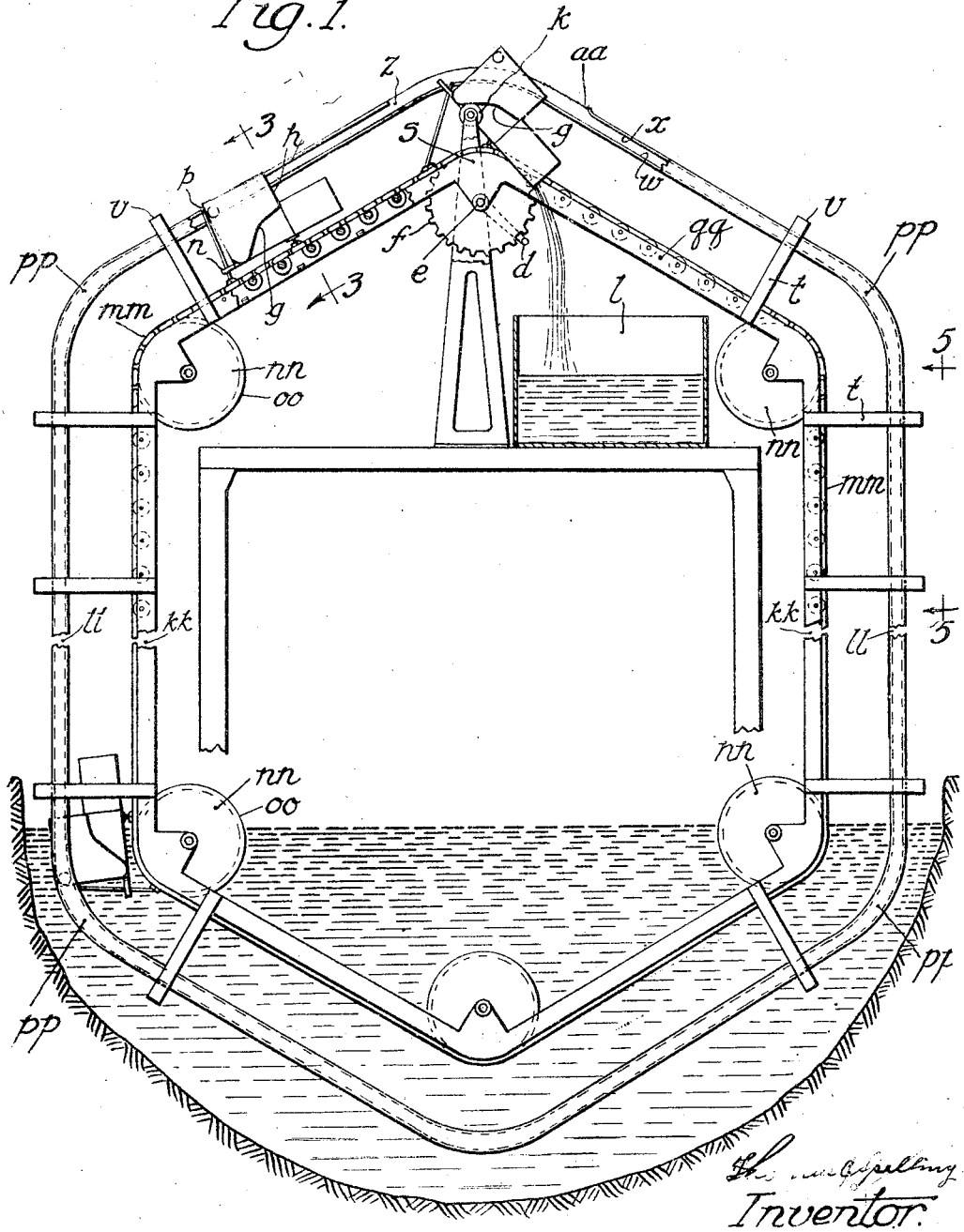

Patented Sept. 8, 1925.

1,552,514

UNITED STATES PATENT OFFICE.

THOMAS C. SPELLING, OF NEW YORK, N. Y.

WATER HOIST.

Application filed October 15, 1923. Serial No. 668,719.

*To all whom it may concern:*

Be it known that I, THOMAS C. SPELLING, a citizen of the United States, residing at the city of New York, county of New York, in the State of New York, have invented certain new and useful Improvements in Water Hoists, of which the following is a specification, reference being had therein to the accompanying drawings.

This invention relates to certain new and useful improvements in water hoists, and deals particularly with a device for hoisting from a lower to a higher level large quantities of water, for storage, or to furnish a constant supply.

As pointing to the utility of the invention, attention is called to the fact that there is general interest in and discussion of uses for water including household, municipal, irrigation, stock-watering and mining uses, and especially for generating power. In the latter case, attention is fixed almost or quite entirely on falls and rapids found in rivers and other streams, it being usually conceded, erroneously, that nature possesses a monopoly of creating high and low water levels.

The object of this invention most simply stated is the provision of means for utilizing stationary or slow moving water for a variety of uses, which need not be here further specified. In some of them the water is consumed or widely dispersed, while in its use for power there will not necessarily be any waste or elimination of the source of supply, except as caused by evaporation. For instance, where the water hoisted is emptied into a receptacle connected with a flume or pipe set at an angle downward to a water wheel, it may be immediately restored to the body of water from which it was taken and hoisted. Use may be also found for the invention where an oleaginous, or any other substance which flows, is to be raised.

Other objects and aims of the invention, broader or narrower according to conditions and circumstances, than those stated above, together with the advantages inherent, will be in part obvious, and in part specifically referred to in the course of the following description of the elements, combinations, arrangements of parts and application of principles constituting the invention; and the scope of protection contemplated will appear from the appended claims.

In the accompanying drawings which form a part of this specification, similar letters of reference, indicate like parts throughout the several views, in which:

Fig. 1 is a general elevation assembly.

Fig. 2 is a side sectional view of carrier, carrier guides and conveying chain.

Fig. 3 is a section on line 3—3 of Fig. 1.

Fig. 4 is a front perspective view of carrier.

Fig. 5 represents an elevation of frame taken on line 5—5 of Fig. 1.

Fig. 6 is an enlarged sectional assembly of chain with removable hook shown attached to carrier and special link.

Fig. 7 is a face view of carrier chain.

Fig. 8 shows a perspective view of loose carrier connection at rear of carrier.

Fig. 9 represents a perspective on line 9—9 of Fig. 3 showing air release panel doors.

Fig. 10 is a perspective view of one corner of a link of the chain.

For a better understanding, I begin with a comprehensive description of certain essential parts, without reference to the figures or designating letters. The power is applied to an endless flat linked chain and will move it upward and downward, and around the ends on an endless sextangular frame. To the chain are attached carriers for water—possibly for other liquids—and these are carried, each in succession upward to a point at which it is emptied into a receptacle. Without even pausing the carrier is moved around and over the apex of the frame and downward to the body of water constituting the source of supply. Continuing the forward movement, each carrier is drawn through the water and around the lower end of the frame, shown in the drawing in submergence, and filled; whereupon, continuing the forward movement, it is again drawn upward. Stationary rollers are placed at points shown in the drawings on the upper and lower terminals of the frame. These rollers are axled into the frame and may be formed of iron, steel, wood, or other hard substance, and be provided with coverings of vulcanized rubber or other suitable material between the flanges, to accommodate slight contractions or extensions of the chain due to variations in temperature. Incidentally, their presence reduces noise and friction. Only one side or end of the supporting structure is here shown, but it is an exact replica of the other side. It will be suitably attached to the frame. It may be remarked that the supporting vertical beams and the cross beams constituting the support may be made from iron, steel, wood or other suitable material, and the vertical beams will extend into the earth beneath the body of water constituting the source of supply. And inasmuch as the strain will be unequal at the sides, lateral supports for the supporting structure will be provided, all of which will be readily understood. The work of construction may be performed most conveniently and economically in a natural or an artificial basin into which the water is afterward introduced but is entirely practicable in stationary or flowing water of moderate depth by resorting to caissons or coffer dams. These may be permanent structures. Flood gates may be placed in their walls to be kept open except when repairs are necessary; then the gates may be closed and the inclosed water pumped out. The chain, a section of which is shown, comprises a series of flat links, $a$, attached to each other with bands, $b$. The stationary rollers, $nn$, are formed with the flanges, $oo$, the space between them being equal to and occupied by the endless flat linked chain, $mm$. The lengths, dimensions and interior open spaces are the same in all the links. A common and uniform basic level being essential for the prevention of friction and jolting in the passage of the chain over the supporting rollers, such basic level is sufficiently approximated by the peculiar formation of the links of the chain and of the connecting bands, as herein-after described.

The crank, $d$, may form part of, or be secured to shaft, $e$. To the end of the crank, the power is applied by means of a shank, not shown. Of course, a wheel and pulley or sprocket wheel and chain may be used in lieu of a crank and shank. On the shaft, $e$, is the cogged or toothed enlargement or wheel, $f$. The shaft, $e$, revolves to the right, speaking now from the viewpoint of the crank. The teeth, or cogs, on the wheel, $f$, are of proper length and lateral dimension to properly engage the internal openings of the links $a$. The surface of the wheel, $f$, is so positioned as to press taut against and cause the chain to cover a small section of the surface. In case of any slight slackening of the chain the rollers in use or one or more of them may be replaced by rollers of greater diameter. The positions and resultant actions of rollers, flanges thereon, and toothed wheel will prevent evil results from swaying of carriers in ascending.

The carriers are formed with the external backwardly and downwardly curved shoulders, $g$, the same on each side, to begin at the middle of the vertical dimension of the mouth, $h$, of the carrier; that is to say, half way from the lower lip, $i$, to the upper lip, $j$. The wheels, $k$, are supported in the supporting structure, by supports, $s$. There are two of these of identical form and function, one on each side of the frame, exactly opposite each other. In order to soften the impact and reduce the shock of contact, rubber tires may be placed on these wheels. It will be observed that the shoulders, $g$, are so formed that the wheels, $k$, do not engage them until one-half the length of the carrier has moved beyond their apices; otherwise too much strain would be thrown on the frontal fastening device, presently referred to. The obvious effect of this tipping device and the positioning of wheels, $k$, relative to the shoulders, $g$, is the tipping, in the course of its progress, of the carrier to such an angle, and gives such additional impetus to the forward and downward movement of its liquid contents, as to entirely empty it into the receptacle, $l$, without interrupting its forward movement. It will be also noted that the position of wheels, $k$, relative to the frame is such that the contents of the carrier would have been already partially emptied, prior to contact of wheels, $k$, and the carrier but for the frontal extension of the lower lip, shown in Fig. 4. This extension has formed in it the indentation or channel, $m$, extending upwardly, as shown, and slanted downwardly and backwardly to its conjunction with the lower lip, $i$. The indentation is wide enough to straddle the frame, $qq$. This extension may be formed as part of the carrier, or separately and be suitably attached. Notwithstanding the fact that the carrier has a forward pitch downward after reaching the apex of the frame, yet the tipping device is necessary, because the forward momentum of carrier and contents might otherwise carry part of the liquid beyond the receptacle, $l$, and spill it outside.

The resisting strength of the mouth may be reinforced by rods placed therein crosswise and suitably attached to the lower and upper lips, and to the sides of the mouth. From a plate under and attached to the lower lip, $i$, extend the legs, $y$, each to be detachably secured to a wing of a link of the chain. The carrier is formed with the ringed nose or strap, $n$, the opening of which, $o$, is oblong to inclose a bar, having on its upper terminal the tap, $p$. The bar is flat and fitable into the ring, or strap, $n$, and curved slightly forward, as shown, to serve as a check for the carrier in the tipping action already described. The sides of the frame, $qq$, are secured to each other by bars, one of which, $u$, is shown in Fig. 3. The lower terminal of the bar at the rear of the carrier has the enlargement or shoulder, $r$, to serve as a resting place for the carrier, and is there bifurcated vertically each leg, $q$, secured to a wing of a link of the chain. This resting place for the rear end of the carrier, being slightly higher than that for the front end, elevates it, causing the line of gravity to slant toward the chain on its upward journey. That is to say the carrier and its load lean slightly toward the chain. It will be noted that this construction obviates contact between the carrier, or any of its adjuncts and any other part of the mechanism.

To prevent wobbling or swaying of the carriers, also to steady the chain in its movement around and about the frame, mechanism and fixtures are attached to the frame and each carrier which I describe as follows: At intervals of space along the frame and on each side of it, are attached to the bases of the sides the supports, $t$, which extend outwardly, then upwardly to a point just outside the space occupied by the carriers. These supports collectively support, on each side, the plate, or shelf, $w$, and the upper plate, or inverted shelf, $x$. These upper plates do not, however, extend all the way. They are gapped between points, $z$, and $aa$, on the top portion of the frame in order that there shall be no interference with the functioning of the tipping and emptying device hereinbefore described. They are not needed there because there will be no tendency there of the carriers to press outwardly, that is upwardly. After the rear of the carrier has tipped, it is guided back into resting place and alignment by the ring, or strap, $n$, and flat bar already described. Through each carrier, and at or near its upper and rear corners are inserted and firmly secured the rod, $bb$, its terminals extending and being positioned between said plates, $w$ and $x$. Each end of the rod, $bb$, is bifurcated horizontally, and horizontal wheel or roller, $cc$, is axled into the prongs formed by the bifurcation, said wheels being designed and adapted, responsively to lateral pressure, to contact with the rear connecting wall formed by the union of the plates. In addition to these horizontally positioned wheels or rollers, there is journalled on the rod, $bb$, at each end and just behind the beginning of the bifurcation above described, the vertically positioned wheel or roller, $dd$, to contact with the lower or upper plate responsively to vertical pressure. As is obvious, the office of the mechanism or device here described is to insure, with the least possible friction, the even, regular movement of the parts, in operation. The connecting rod, $v$, is provided, the same to be attached to and to connect the respective combinations of plates, the rod extending from side to side, above the pathway of the carriers. It may prove more economical to construct this connecting rod and the support as a single part. In order to avoid the possibility of friction or locking at the angular turns, the plates may be flared apart vertically at the points marked, $pp$.

Owing to important and special functions of the chain, a further and more detailed description of its parts is required. Because of the necessity for evenness in its passage over the parts with which it comes in contact each link is beveled on both the upper and nether side, at each end, to the extent of the exact thickness of the band with which it is attached to its fellow link, the end portions of each link being thus raised relatively to the base of the link. This rule applies likewise to the specially formed links to which carriers are attached. The hook formation at the end of each prong or leg, $y$, of the fastening means carried by the carriers will be now referred to. To preserve to these special links strength equal to the others they are each formed with considerably thicker side parts, but of the same length and width as the ordinary links. The cavity, $ee$, is then made centrally in each side, and across this cavity the rod or bolt, $ff$, extends through the adjacent integral sides, and suitably fastened therein. The rear end, or bottom of the carrier has a collapsible door, that is to say, the door comprises two panels, $hh$, hinged by hinges, $ii$, to integral parts, the former supported inwardly each by the mild pressure of a spring, $gg$, the springs not being so strong as to prevent the weight of liquid forcing the hinged parts back into conjunction with the integral parts. This formation will minimize or obviate the shock and sudden strain of contact on the chain of an empty inverted carrier full of air and will in use allow the air to escape without resistance through the bottom ahead of the water. The spring door is in two panels, $hh$, of proper form and size to open inwardly and to effect a closure when positioned in a plane with the integral portion of the bottom. Each of the two parts is attached with the hinges, $ii$, to an integral portion of the bottom, and each of the two parts carries a flexible impervious flap, the position of which is marked, $jj$, to perfect the closure, suitably attached to its interior edge, the one part carrying it on all its edges, the other on all edges except its interior edge where it meets its fellow panel. These flaps extend over the interstices where the parts meet.

A common motive power may be used for a plurality of such hoists, economizing in constructive and installation costs, in proportion to the quantity of water hoisted. It will be observed that the shaft and axle are positioned parallel with the receptacle. In order that other hoists may be served with the same power plant, it will only be necessary to extend the common axle to and through them, and likewise extend the receptacle. Due to the variety of uses for water to be hoisted, there may be other forms of receptacle than that here shown, designated, *l*. It is a wide shallow box, minus one side and end, slanted downward from the integral end. By suitable modification of its open end it may be connected with a tank, reservoir, flume pipe or other conduit. Figure 1 shows only the terminals of frame and guiding mechanism. Middle portions are omitted at, *kk* and *ll*, respectively.

The utility in practice of the invention will vary greatly according to circumstances and natural or other environment and the dimensions of the machine as constructed. Nor could any estimates of the quantity of water deliverable within a given space of time be given without reference to circumstances, conditions and dimensions which it is not practicable to here set forth. In order to eliminate friction and economize power all journals may be provided with roller bearings.

What I desire to secure by United States Letters Patent is:

1. A water hoist comprising an obtusely angled sextangular frame supported in place with its greater dimension vertical, an endless chain positioned on and around the frame having movement on horizontally positioned rollers axled in the sides of the frame, carriers attached to the chain and moved therewith, and a toothed wheel, the teeth of the wheel formed and positioned to engage the links of the chain, the whole adapted to hoist water or other liquid upon submergence of the bottom terminal of the assembled structure and application of power to the wheel.

2. A water hoist comprising an obtusely angled sextangular frame supported in place with its greater dimension vertical, an endless chain positioned on and around the frame having movement on horizontally positioned rollers axled in the sides of the frame, carriers attached to the chain and moved therewith, and a toothed wheel, the teeth of the wheel formed and positioned to engage the links of the chain, the whole adapted to hoist water or other liquid upon submergence of the bottom terminal of the assembled structure and application of power to the wheel, some of the rollers positioned intermediately the angles, one roller positioned in each angle of the frame.

3. A water hoist comprising an obtusely angled sextangular frame supported in place with its greater dimension vertical, an endless chain positioned on and around the frame having movement on horizontally positioned rollers axled in the sides of the frame, carriers attached to the chain and moved therewith, and a toothed wheel, the teeth of the wheel formed and positioned to engage the links of the chain, the whole adapted to hoist water or other liquid upon submergence of the bottom terminal of the assembled structure and application of power to the wheel, and means for emptying the carriers of their contents during continuous forward movement of the carriers.

4. A water hoist comprising an obtusely angled sextangular frame supported in place with its greater dimension vertical, an endless chain positioned on and around the frame having movement on horizontally positioned rollers axled in the sides of the frame, carriers attached to the chain and moved therewith, and a toothed wheel, the teeth of the wheel formed and positioned to engage the links of the chain, the whole adapted to hoist water or other liquid upon submergence of the bottom terminal of the assembled structure and application of power to the wheel, and means for emptying the carriers of their contents during continuous forward movement of the carriers, the means consisting of stationary wheels so positioned relative to the track of the chain as to be struck by slanted shoulders on each carrier, and to tip the rear end thereof upward during its continuous forward movement.

5. In a water hoist a chain formed of flat links and flat sided elliptical connecting bands, the thickness of the ends of the links reduced, the bands of thickness equal to one half of the reduction in relative thickness of the ends of the links, the upper sides and bases of the links and bands resting in a common plane.

6. In a water hoist, carriers, each formed with an external shoulder on each side, the shoulder extending horizontally from the edge of the mouth of the carrier a fractional part of its length, thence slanting downward.

7. In a water hoist, carriers, each formed with a downwardly faced lateral extension on each side, each extension beginning at a point midway between the upper and lower lip of the carrier and extending horizontally a fraction of the length of the carrier, and thence slanted to its rear base.

8. In a water hoist, means for attaching a carrier to a flat linked chain and allowing and limiting upward movement of the carrier on and above the chain, the means comprising a member suitably attached to the frontal base of the carrier, the member formed with two legs, each leg having a lateral extension formed at its free end to engage a link of the chain, and a slanted member attached to a link of the chain, the same having an enlargement of its free end to check upward movement and a supporting shoulder near to and above the point of attachment to the chain to arrest downward movement of the rear end of the carrier, the slanted member encircled in assembled relation by a ringed extension of the carrier.

9. In a water hoist, a frontal extension for a carrier, adapted to be fitted and attached to the carrier, the extension being a shell, having, netherly, a trench or indentation extending slantingly upward to the outer extremity of the shell, the trench or indentation of suitable width to straddle a frame element of the hoist.

10. In a water hoist, the combination of an obtusely angled sextangular frame supported in place with its greater dimension vertical, horizontal rollers axled in the sides of the frame, each roller formed with space between flanges thereon for a chain positioned at right angles to the roller, an endless chain and carriers attached thereto and moved therewith on the rollers, with means for emptying each carrier of its contents, the means consisting of stationary wheels, one on each side of the frame, positioned so as to be simultaneously struck by slanted shoulders on the sides of each carrier during continuous forward movement thereof, and to lift the rear end of the carrier and simultaneously empty the contents thereof.

11. In a water hoist a carrier of flowing substance, the carrier formed and adapted to release the air contained therein upon its contact with a body of liquid, that is to say, having a spring door in its bottom in two parts of a proper form and size to open inwardly and to effect a closure when positioned in a plane with the integral portion of the bottom, the one part carrying a flexible impervious flap all around on its interior edge, the other a similar flap on its interior edge on all sides except that opposite the hinged side, to perfect the closure, the two parts hinged to an integral section of the bottom, each respectively, resting on a spring of sufficient strength to move and hold its part in an oblique position relative to the integral part, but not sufficient to resist the weight and force of an inflowing liquid.

12. In a water hoist, comprising a sextangular frame, stationary rollers axled therein, a chain having movement around and about the frame and on the rollers, and carriers for liquids, means to check and limit the swaying and wobbling of the carriers and to steady the movement of the chain, said means consisting of supports attached to the sides of the frame, extended laterally then upwardly, and supporting an upward and nether plate positioned around and about the frame near the path of the carriers in their movement around and about the frame, formed and so positioned as to engage both horizontally and vertically revolving rollers carried by the carriers, the rollers, so carried, axled in and on the terminals of rods extending through the upper rear ends of the carriers.

13. In a water hoist, wherein are combined a sextangular frame, rollers axled therein, a flatlinked chain having movement around and about the frame, and carriers for liquid, upper and corresponding nether plates supported on the frame, outside the path of the carriers, with horizontally and vertically revolving rollers axled in and carried in and on the terminals of rods extended through the upper and rear ends of the carriers.

14. A water hoist comprising an obtusely angled sextangular frame supported in place with its greater dimension vertical, an endless chain positioned on and around the frame having movement on horizontally positioned rollers axled in the sides of the frame, carriers attached to the chain and moved therewith, and a toothed wheel, the teeth of the wheel formed and positioned to engage the links of the chain, the whole adapted to hoist water or other liquid upon submergence of the bottom terminal of the assembled structure and application of power to the wheel, the chain consisting of links and bands, each band formed and adapted to connect any two links, the links and bands, in assembled relation to each other, resting and moving in a common plane and on an even base.

15. In a water hoist, the combination of means for attaching the front end of a carrier to a flat linked chain with means for movably attaching the rear end to the chain, the means for attaching the front end consisting of a member formed with two legs, each leg having a lateral extension of its free end to engage a link of the chain, the means for the rear attachment consisting of a slanted member attached to a link of the chain, the same having an enlargement of its free end to check upward movement and a supporting shoulder near to and above the point of attachment to the chain, to arrest downward movement of the rear end of the carrier, the slanted member encircled in assembled relation by a ringed extension of the carrier.

16. In a water hoist, the combination of an obtusely angled sextangular frame supported in place with its greater dimension vertical, horizontal rollers axled in the sides of the frame, an endless chain for moving carriers attached to the chain and moved on the rollers upon the application of power to the chain, with a receptacle for liquids suitably dimensioned and positioned relatively to the other parts to receive from the carriers liquid contents thereof during continuous forward movement of the carriers.

17. A water hoist comprising an obtusely angled sextangular frame supported in place with its greater dimension vertical, an endless chain positioned on and around the frame having movement on horizontally positioned rollers axled in the sides of the frame, carriers attached to the chain and moved therewith, and a toothed wheel, the teeth of the wheel formed and positioned to engage the links of the chain, the whole adapted to hoist water or other liquid upon submergence of the bottom terminal of the assembled structure and application of power to the wheel, some of the rollers positioned intermediately the angles, also one roller positioned in each angle of the frame, the circumference of each roller which is positioned in an angle corresponding and flush with the curvature of the adjacent angle.

THOMAS C. SPELLING.